(12) United States Patent  (10) Patent No.: US 8,605,590 B2
Sivakumar et al.  (45) Date of Patent: Dec. 10, 2013

(54) SYSTEMS AND METHODS OF IMPROVING PERFORMANCE OF TRANSPORT PROTOCOLS

(75) Inventors: Raghupathy Sivakumar, Alpharetta, GA (US); Aravind Velayutham, Atlanta, GA (US)

(73) Assignee: EMC Corporation, Hopkinton, MA (US)

( * ) Notice: Subject to any disclaimer, the term of this patent is extended or adjusted under 35 U.S.C. 154(b) by 376 days.

(21) Appl. No.: 12/908,379

(22) Filed: Oct. 20, 2010

(65) Prior Publication Data

US 2011/0116380 A1    May 19, 2011

Related U.S. Application Data

(63) Continuation of application No. 11/672,390, filed on Feb. 7, 2007, now Pat. No. 7,839,783.

(60) Provisional application No. 60/765,787, filed on Feb. 7, 2006.

(51) Int. Cl.
    *H04L 12/26*    (2006.01)

(52) U.S. Cl.
    USPC .......................................... 370/235; 370/231

(58) Field of Classification Search
    USPC ............... 370/235, 229–236.2, 242–253, 395
    See application file for complete search history.

(56) References Cited

U.S. PATENT DOCUMENTS

| | | | |
|---|---|---|---|
| 6,252,851 B1* | 6/2001 | Siu et al. | 370/236 |
| 6,744,730 B2* | 6/2004 | Le et al. | 370/229 |
| 6,754,228 B1* | 6/2004 | Ludwig | 370/468 |
| 7,130,268 B2* | 10/2006 | Mascolo | 370/232 |
| 2005/0083850 A1* | 4/2005 | Sin et al. | 370/252 |
| 2005/0165950 A1* | 7/2005 | Takagi et al. | 709/236 |
| 2007/0280115 A1* | 12/2007 | Meyer et al. | 370/236 |

* cited by examiner

*Primary Examiner* — Thai Hoang
(74) *Attorney, Agent, or Firm* — Ballard Spahr LLP

(57) ABSTRACT

Systems and methods of improving transport protocol performance are disclosed. One exemplary method includes: in a first state, non-linearly increasing a congestion window; in response to the congestion window exceeding a threshold value while in the first state, transitioning to a second state; and in the second state, linearly increasing the congestion window.

13 Claims, 11 Drawing Sheets

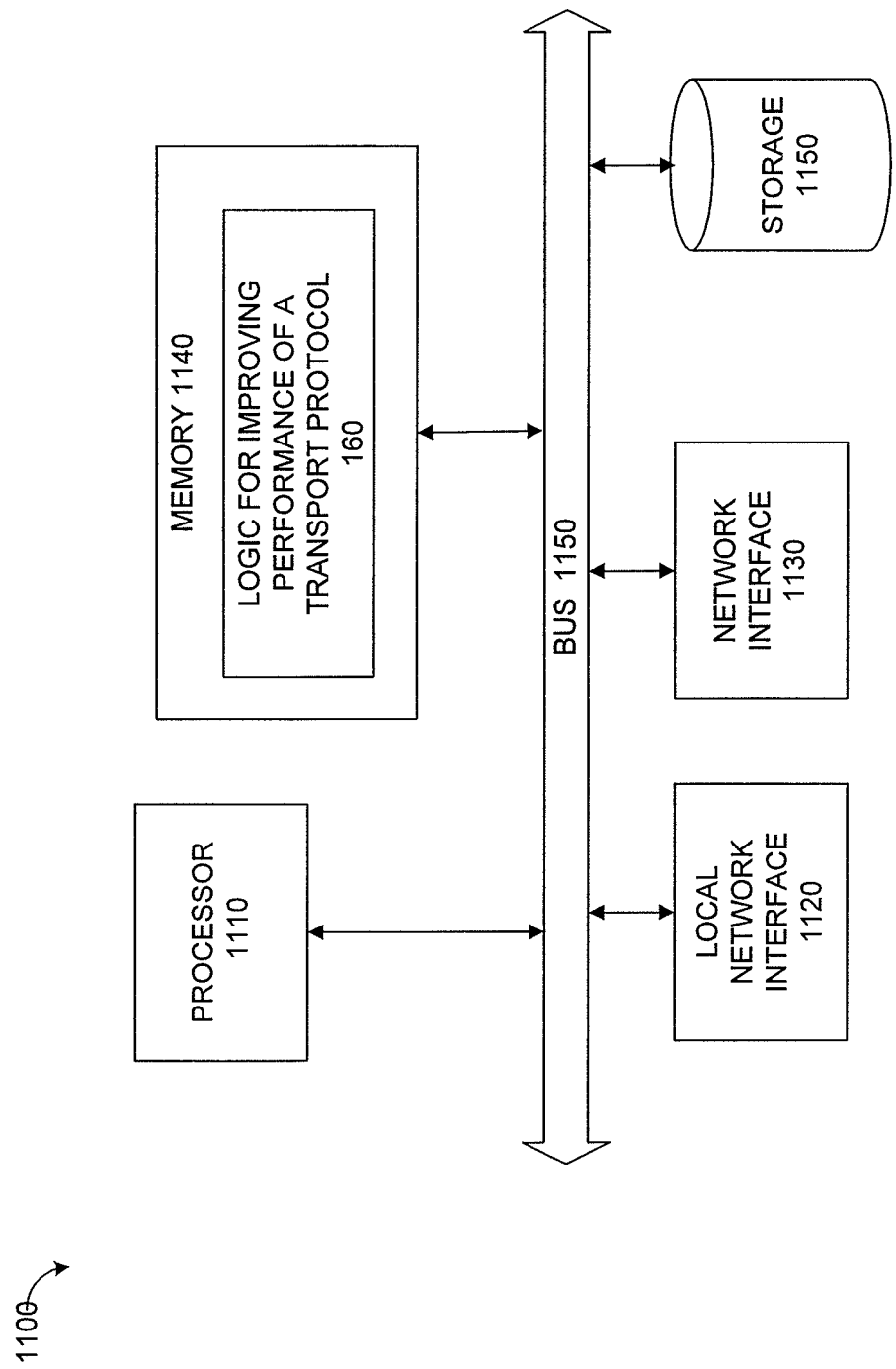

SYSTEMS AND METHODS OF IMPROVING PERFORMANCE OF TRANSPORT PROTOCOLS

CROSS-REFERENCE TO RELATED APPLICATIONS

This application is a continuation of U.S. application Ser. No. 11/672,390 filed Feb. 7, 2007, now U.S. Pat. No. 7,839, 783, which claims benefit of the filing date of U.S. Provisional Application No. 60/765,787 filed Feb. 7, 2006, each of which are herein incorporated in their entirety by this reference.

FIELD OF THE DISCLOSURE

The present disclosure relates to communication protocols, and more specifically, to transport-layer protocols.

BACKGROUND

The transport protocol known as Transmission Control Protocol (TCP) has been performing well for the past two decades as the de-facto transport protocol for reliable data delivery over the Internet. Although the algorithms used by TCP were designed to promote stability, reliability, and fairness on the Internet, these same algorithms lead to reduced TCP performance in the presence of certain conditions along the end-to-end path between the communicating systems. These characteristics, which include large bandwidth, large delay, and/or significant loss-rate, are becoming more common in today's Internet. Although the basic algorithms used by TCP have been modified over the years, significant change to these algorithms is unlikely, since there is such a large installed base of systems which use TCP. Therefore, a need exists for these and other problems to be addressed.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

FIG. 11 is a block diagram of a general-purpose computer than can be used to implement the systems and methods of improving performance of transport protocols disclosed herein.

SUMMARY

Systems and methods of improving transport protocol performance are disclosed. One exemplary method includes: in a first state, non-linearly increasing a congestion window; in response to the congestion window exceeding a threshold value while in the first state, transitioning to a second state; and in the second state, linearly increasing the congestion window.

DETAILED DESCRIPTION

Figure 1:
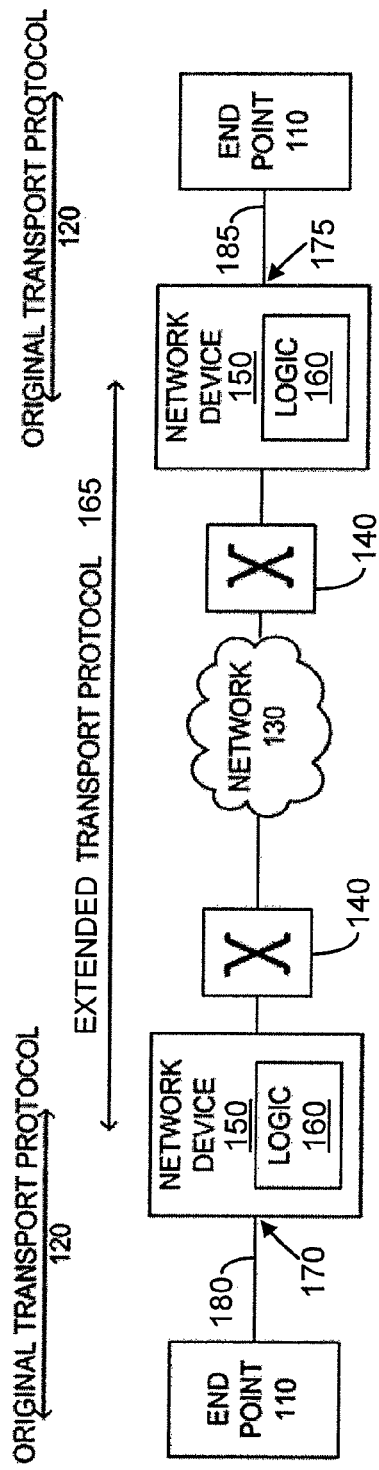
FIG. 1 is a block diagram of an environment in which one embodiment of a system and method for improving performance of transport protocols is located.

FIG. 1 is a block diagram of an environment in which one embodiment of a system and method for improving performance of transport protocols is located. Endpoint devices 110 use a transport-layer (layer-4) protocol 120, and communicate with one another over a network 130. Although this disclosure discusses TCP as an exemplary transport-layer protocol, a person of ordinary skill in the art should recognize that the principles disclosed herein for improving performance of transport protocols also apply to other transport-layer protocols. Routers 140 transport traffic across the network 130, which may involve the use of a network-layer (layer-3) protocol such as Internet Protocol (IP). Although the term "router" is used herein, a person of ordinary skill in the art should recognize that router 140 may take the form of a layer-3 switch instead.

Network devices 150 are located (logically) between endpoints 110 and routers 140. Each network device 150 includes logic for improving performance of transport protocols 160, which allows a network device 150 to communicate with a peer network device 150 using an extended transport protocol 165. Thus, a pair of endpoints 110 communicates with each other through a pair of network devices 150. Although a network device 150 appears between an endpoint 110 and a router 140 in FIG. 1, this is a logical rather than a physical representation, indicating merely that packets pass through the network device 150. As will be explained below, some embodiments of the network device 150 are not actually placed inline between an endpoint 110 and a router 140, but instead operate as an offline device hanging off router 140.

Some embodiments of a network device 150 include an endpoint network interface 170 and a peer network interface 175, where the endpoint network interface 170 is coupled to an endpoint 110 through a link 180 and the peer network interface 175 is coupled to a router 140 through a link 185. Other embodiments of a network device 150 include a single network interface coupled to the router 140. (A single interface embodiment can be used "offline" rather than inline, as will be described below.

In some embodiments, the links in the network 130 exhibit different performance characteristics than the links to endpoints 110. For example, links to the endpoints 110 may provide a relatively high-speed wired connection (e.g., 100 Mbit Ethernet) while links in the network 130 may provide a lower-speed wired or wireless connection (e.g., T1, WiFi). The extended transport protocol 165 is designed for the performance characteristics of the links between network devices 150.

In some embodiments of the network device 150, the extended transport protocol 165 is different than the transport protocol 120 used by the endpoints 110: the protocol used between an endpoint 110 and its corresponding network device 150 is the original transport protocol 120; the protocol used between peer network devices 150 is the extended transport protocol 165. In such embodiments, the network device 150 acts as a transport proxy for an endpoint 110. In some proxy embodiments, the endpoint 110 is unaware that the endpoint 110 is using a different transport protocol, in which case the network device 150 is a transparent transport proxy for an endpoint 110. As will be described in further detail below, the network device 150 maintains transparency by responding to packets sent by the TCP endpoints in such a way that the endpoints are aware of only the proxy as the other communicating endpoint and not the actual receiver.

The term "extended transport packets" will be used hereinafter when referring to packets used by the extended transport protocol 165. A person of ordinary skill in the art should recognize that such a protocol typically includes packets that carry data (data packets), packets that acknowledge data (acknowledgement packets), and control packets that are used to setup teardown connections. Thus, reference will be made herein to "extended transport data packets" and "extended transport acknowledgment packets" and "extended transport control packets". These packets correspond to, but are different than, the original transport protocol. For example, a TCP Data packet and an extended transport data packet both carry data, but the TCP Data packet originates from or is delivered to a TCP endpoint 110 while the extended transport data packet is conveyed between transport proxy peers 150. In some embodiments, the extended transport packets are formed by adding trailer fields to the original transport protocol packets. For example, a TCP data packet is translated to an extended transport data packet by appending a "protocol type" field of "extended transport data", while a TCP control packet is translated to an extended transport control packet by appending a "protocol type" field of "extended transport control". This can be considered a form of encapsulation, but has the advantage of being transparent to the endpoints. In some cases, an extended transport packet is conveyed alone, without encapsulation. In these cases, the Protocol Type field in the IP header may be set to a special value indicating the presence of the extended transport protocol. That is, the extended transport protocol 165 is viewed by the IP, or network, layer as a protocol type like TCP or UDP.

A person of ordinary skill in the art should appreciate that the logic for improving performance of transport protocols 160 can be instantiated in several different ways. One example implements the logic 160 in a standalone 150 device that sits between the TCP communication end-device and the access router 140. Another instantiation of the logic 160 is within the endpoint 110, for example, as a kernel driver sitting between the TCP and IP layer of the kernel protocol stack. As yet another example, the logic for improving performance of transport protocols 160 can replace TCP as a transport layer in the protocol stack of the endpoint 110. Although only the standalone network device 150 is discussed herein, all such instantiations are intended to be within the scope of this disclosure.

Figure 2:
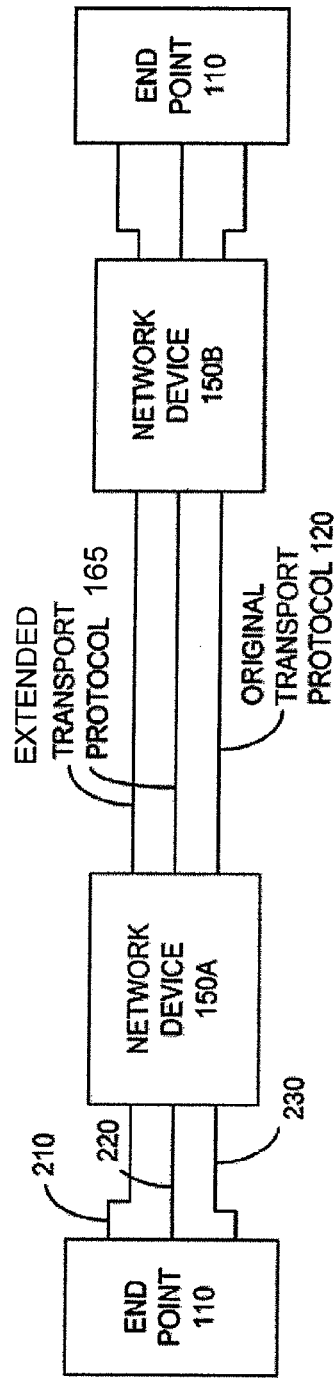
FIG. 2 is a block diagram of an environment in which another embodiment of a system and method for improving performance of transport protocols is located.

FIG. 2 is a block diagram of an environment in which another embodiment of a system and method for improving performance of transport protocols is located. In this environment, a pair of endpoints 110 may include multiple connections 210, 220, 230 between the peers. Each of these connections (210-230) passes through improved network device 150A and 150B. In this embodiment, the network device 150 decides, on a connection-by-connection basis, whether to use the extended transport protocol 165 or the original transport protocol 120 for the leg of the connection between network devices 150. In the example of FIG. 2, connections 210 and 220 use the extended transport protocol 165 for the middle leg, and connection 230 uses the original transport protocol 120.

In some embodiments, a user (e.g., a system administrator) decides which connections will use which transport protocol, and configures the network device 150 accordingly. Several configuration examples are: all connections from a particular endpoint 110 use extended transport protocol 165; no connections from a particular endpoint 110 use extended transport protocol 165; those connections from a particular endpoint 110 identified by a specific combination of header fields use extended transport protocol 165; those connections from a particular endpoint 110 not identified by a specific combination of header fields do not use extended transport protocol 165. A person of ordinary skill in the art should recognize that these are merely examples, and that many other techniques for determining which connections use the extended transport protocol 165 are also possible.

Figure 3:
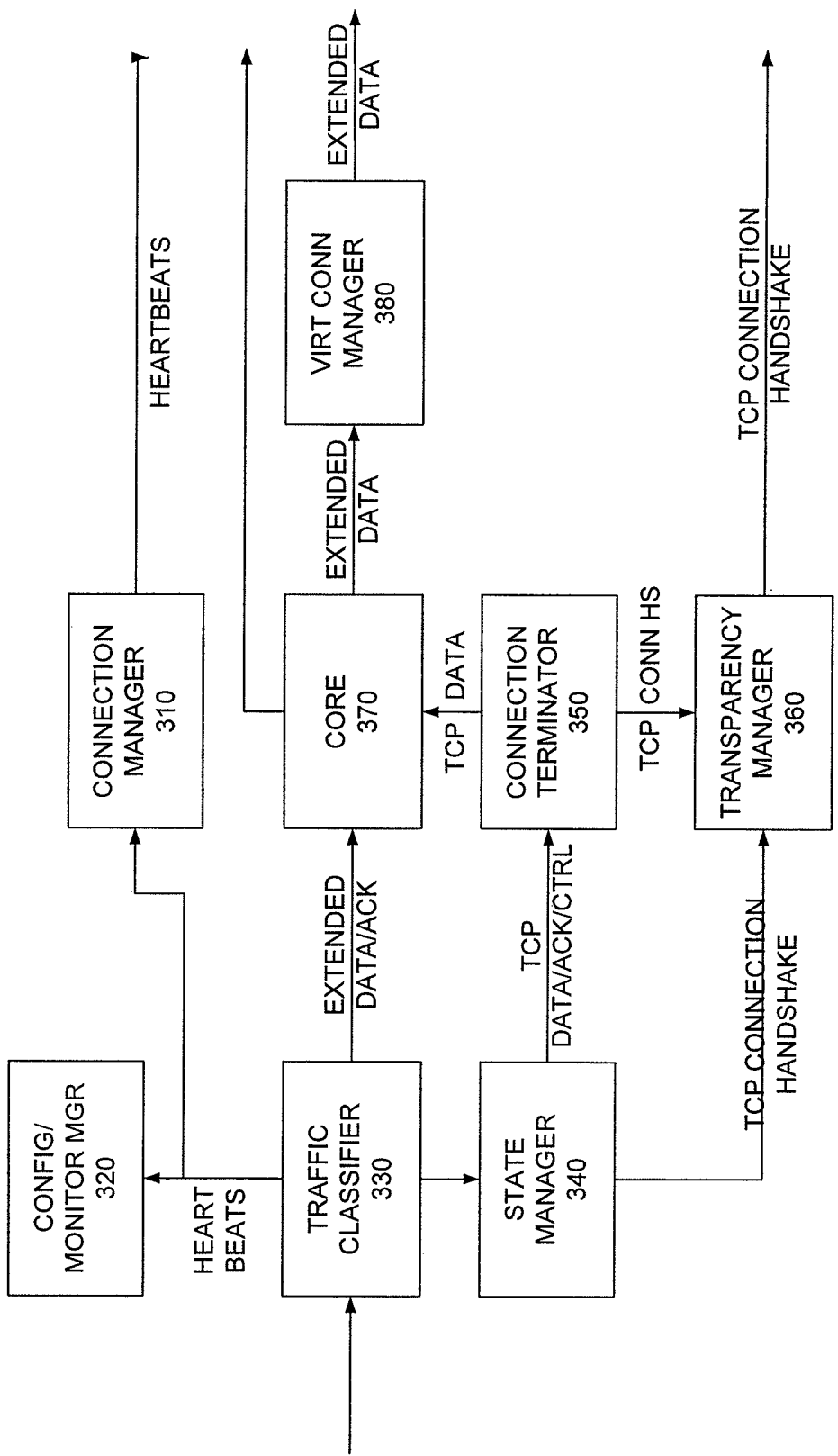
FIG. 3 is a block diagram of the logic for improving performance of transport protocols 160 from FIG. 1.

FIG. 3 is a block diagram of the logic for improving performance of transport protocols 160 from FIG. 1. A connection manager 310 sets up connections to other network devices 150 in the network, and maintains general state information about other network devices 150. The connection manager 310 may discover the presence of, and addresses of other network devices 150 through a configuration database (local or centralized), or through a dynamic learning process, or through any other appropriate mechanism known to a person of ordinary skill in the art.

Once a peer device 150 is discovered, the connection manager 310 monitors for failure of a peer device 150. If a failure is discovered, the connection manager 310 notifies other components in the logic for improving performance of transport protocols 160 about the failure. Each component takes appropriate action in response to the peer failure. In some embodiments, recognition of peer failure is accomplished through a heartbeat signal between peer network devices 150. The connection manager component 310 transmits the heartbeat signal of its device 150, and also monitors the heartbeat of other peer devices 150. The absence of a heartbeat then signifies failure of a peer device 150.

A configuration and monitoring manager 320 allows the operation of the network device 150 to be tuned. The configuration and monitoring manager 320 also monitors performance characteristics of both the network device 150. In some embodiments, the configuration and monitoring manager 320 also monitors performance characteristics of endpoint traffic flowing through device 150.

A traffic classifier 330 classifies network traffic entering the network device 150. Classification is based on an N-tuple formed by the headers on the incoming packer. In some embodiments, the N-tuple is the 4-tuple comprising sender IP address, destination IP address, sender TCP port, and destination TCP port. The traffic classifier 330 also performs deep inspection of the packets in order to identify special connection control packets (e.g., SYN, ACK, FIN, etc.). The traffic classifier 330 then notifies other logic components of these control packets.

After classifying, the traffic classifier 330 decides whether to direct the packet through other components in logic 160, or through the default forwarding path. This decision is made in consultation with the configuration and monitoring manager 320 (described below), which maintains information about protocol improvement preferences (e.g., which connections the improvements are applied to, and which connections use the conventional protocol).

The state manager 340 maintains state about those TCP connections to which improvements are applied. The state manager 340 learns about the setup and teardown of TCP connections from the deep inspection data provided by the traffic classifier 330. In some embodiments, connections are hashed or indexed based on the N-tuple in the connection control packets, which facilitates faster connection lookups and packet identification. The state manager 340 also maintains information about active connections that have been consistently sending/receiving packets, and those that have remained idle. This distinction helps to achieve fairness among the different TCP connections, and allows the logic 160 to penalize connections that have been getting more than their fair share of the capacity.

The connection terminator 350 acts as the destination and source, respectively, to the source and destination of the endpoint TCP connections. Therefore, the connection terminator 350 includes the functionality of a TCP endpoint, such as connection management, packet sequencing, congestion control, flow control, acknowledgement transmissions, acknowledgement receipt processing, loss detection, and loss recovery. The connection terminator 350 also acts as an adapter between the extended transport protocol 165 and the original transport protocol 120, propagating decisions to the TCP sender or receiver in a form understandable by these endpoints 110. For example, when the logic 160 makes a flow control decision "no more data to be transmitted", the connection terminator 350 conveys this decision to the TCP sender endpoint 110 through an advertised window size of zero. The connection terminator 350 also maintains and manages data buffers to handle out-of-order delivery, packet losses, packet retransmissions, etc.

The transparency manager 360 works with the state manager 340 to ensure that the negotiated parameters between the two TCP end-systems (e.g., maximum transmission unit, the availability of the selective acknowledgment feature, etc.) are consistent with those required by the logic 160. As described earlier, the traffic classifier 330 performs deep packet inspection and examines TCP control packets (e.g., SYN, ACK, FIN). The transparency manager 360 is notified of the parameters used in these SYN and SYN-ACK control packets. If the original default parameters themselves are compatible with the requirements of logic 160, such parameters are let through as-is. However, when the default parameters are not compatible, the transparency manager 360 modifies the connection control packets to use the alternate parameters.

The core 370 delivers data between peer network devices 150, implementing the extended transport protocol 165. Several features of the extended transport protocol 165 will be described below. In transparent transport proxy embodiments, network devices 150 perform their operations based on the addition and processing of trailers that are added to the packets received from the TCP endpoints. Thus, the packets flowing between two network, devices 150 are similar to the packets sent by the original communicating end-points. Since existing network components use headers to identify and process packets, this inventive feature (along with the bridge functionality described above) allows the extended transport protocol 165 to be transparent to other network components.

Finally, the virtual connection manager 380 maps TCP connections to multiple virtual connections between peer devices 150 and aggregates these virtual connections. The aggregated virtual connections, which form a virtual end-to-end path, are referred to herein as "pipes." An example of such an implementation is described in U.S. Ser. No. 11/063,284, titled "Systems and Methods for Parallel Communication", which is entirely incorporated by reference herein. In some of these embodiments, the number of virtual connections is configurable and can be dynamically chosen by the logic 160.

FIG. 3 shows that packets are passed from one component to another for processing. In some embodiments, a zero-copy technique is used which increases the efficiency of the memory use. Zero-copy packet processing uses a NumReferences field in the internal packet representation to track the number of components accessing the packet. Whenever a component processes a packet, it increases the NumReferences field. When the component is finished with processing, it decreases the num_references value. This avoids the need for a copy when passing packets between components.

Figure 4:
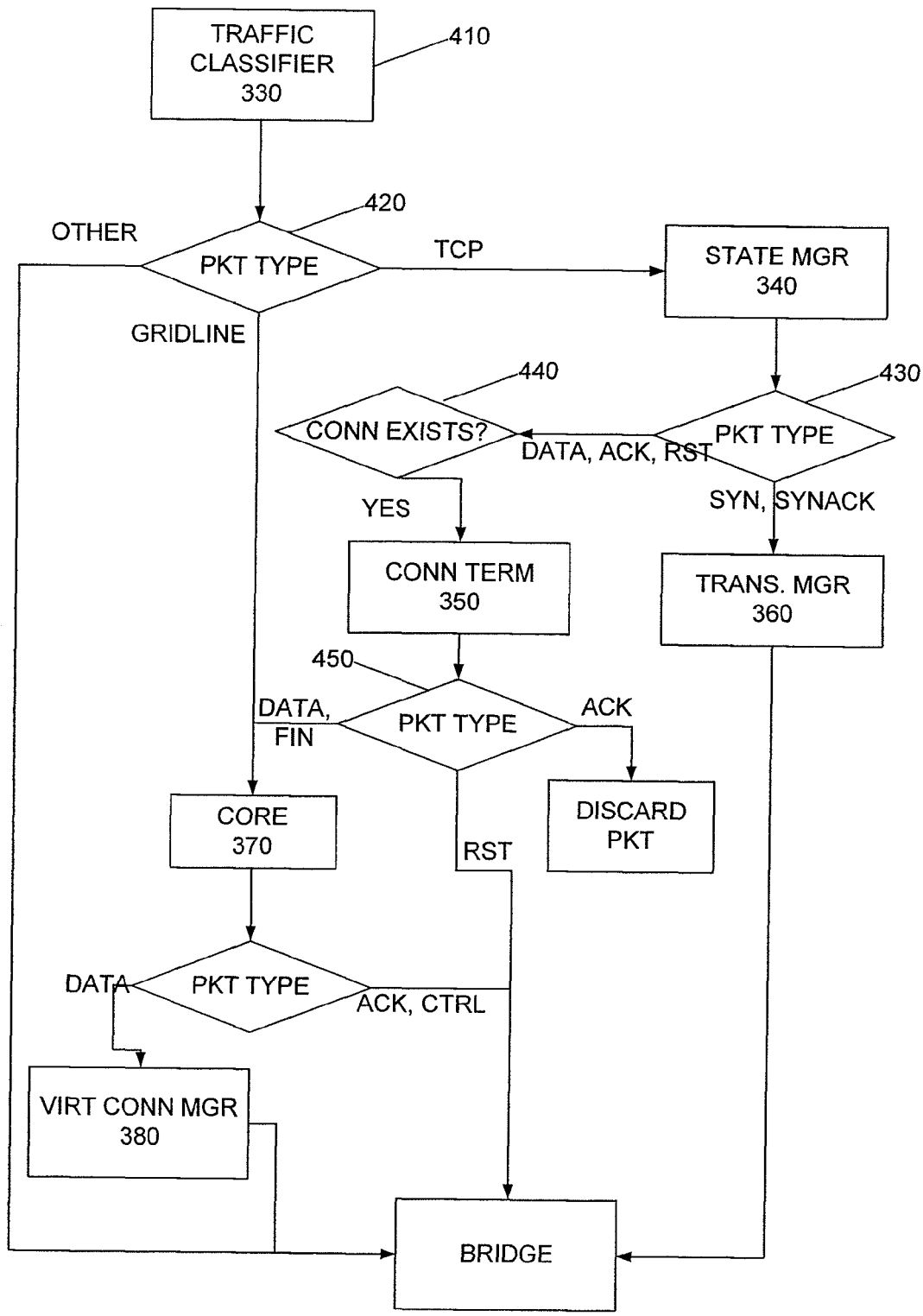
FIG. 4 is a data flow diagram showing the processing of packets by the logic for improving performance of transport protocols 160 of FIGS. 1 and 3.

FIG. 4 is a data flow diagram showing the processing of packets by the logic for improving performance of transport protocols 160 of FIGS. 1 and 3. Processing of incoming packets begins with the traffic classifier 330, which uses the source IP address, destination IP address and protocol header fields to classify (410) the packet. If the protocol type field indicates that the packet is neither a TCP packet nor an extended transport packet, then the packet is forwarded, without modification, to a logical layer-2 bridge 420, which transmits the packet. As should be understood by a person of ordinary skill in the art the bridge 420 has a single IP address and couples the endpoint network interface 170 and peer network interface 175 by maintaining a table of mappings between layer-3 (IP) addresses and layer-2 (MAC) addresses. When given a packet for transmission, the bridge 420 examines the layer-3 address in the packet and determines which interface (endpoint network interface 170 and peer network interface 175) to transmit on, based on the address table. Therefore, in the discussion below, reference will be made to transmitting, sending, or forwarding a packet, without specifying which interface.

Operating as a bridge allows the network device 150 including logic for improving performance of transport protocols 160 to perform packet interception and processing without requiring a change to the routing tables on the TCP endpoints 110. Bridge operation also allows the network device 150 to operate as an offline device, located off the router 140, instead of inline between the TCP endpoints 110 and the router 140.

If the packet is classified (410) by the traffic classifier 330 as a TCP packet, then the packet is provided to the state manager 340. The state manager 340 determines (430) the type of the TCP packet. If the TCP packet is a connection setup packet (e.g., SYN or SYNACK), then state manager 340 creates or updates the connection state, respectively, and hands off the packet to the transparency manager 360. As described earlier, the transparency manager 360 examines the connection options during setup, as conveyed in the TCP SYN and TCP SYNACK packets, and modifies these options as needed to insure compatibility with the extended transport protocol 165. The transparency manager 360 then forwards the TCP control packet.

If the state manager 340 determines (430) that the TCP packet is a RST packet, then the state manager 340 determines (440) whether the connection exists (e.g., by consulting a connection hash table). If the connection exists, then the connection is deleted by the state manager 340 and the TCP control packet is forwarded. Returning to the determination 430 by the state manager 340, if the packet is a FIN packet and the connection exists, and then the connection state is updated. If a FIN has also been received by the local endpoint, then the connection is deleted. In either case, the state manager 340 requests the connection terminator 350 to send the TCP FIN packet, and then forwards the TCP FIN packet.

Returning again to the determination 430 by the state manager 340, if the TCP packet is an ACK or a TCP data packet, then the state manager 340 determines whether the connection exists (e.g., by consulting a connection hash table). If the connection does not exist, then the state manager 340 forwards the TCP packet. If the connection does exist, then the state manager 340 updates state information hands off the packet to the connection terminator 350.

After receiving the TCP packet from the state manager 340, the connection terminator 350 classifies (450) the TCP packet. If the TCP packet, is an ACK, the connection terminator 350 performs appropriate housekeeping as indicated by receipt of the acknowledgement, and discards or consumes the ACK.

The housekeeping performed by the connection terminator 350 will now be described in connection with the flowchart of FIG. 5. The connection terminator 350 begins processing the acknowledgement at block 510, where the acknowledged packets are removed from the TCP send buffer. Next, at block 520, the in-sequence number is updated to reflect the acknowledgment. Then the count of in-flight packets is updated at block 530. Processing continues at block 540, where the maximum allowed outstanding packets is updated. Finally, block 550 is executed in an iteration loop while the in-flight count is less than the maximum allowed outstanding packets, where 550 sends the next packet in the TCP send buffer.

Returning now to the classification (450) by the connection terminator 350 in FIG. 4, if the TCP packet is data rather than a control packet, then the connection terminator 350 processes the packet further. This processing of TCP data packets by the connection terminator 350 will now be described in connection with the flowchart of FIG. 6.

The connection terminator 350 begins processing a packet at block 610, which compares the buffer size of the core component (370) to a threshold. If the buffer size meets the threshold, then block 620 sends a DUPACK for the next in-sequence packet. Next, the packet is discarded (block 630), and processing of the packet is complete. If the core component's buffer size does not meet the threshold, then processing continues at block 640. Block 640 determines whether the received packet is the next in-sequence packet. If No, then at block 645 the received packet is inserted into the TCP receive buffer, block 650 sends a DUPACK for the next in-sequence packet, and processing of this packet is complete. On the other hand, if block 640 determines that the received packet is the next in-sequence packet, then processing continues at block 655.

Block 655 updates the connection state. Next, at block 660 the core component 370 is requested to send the packet. Processing continues at block 665, which determines whether the TCP receive buffer is empty. If empty, then block 670 sends an acknowledgement for the received packet, and processing of the packet is finished. If the TCP receive buffer is not empty, then block 675 notifies the core component 370 that all in-sequence packets in the buffer are ready for transmit processing. Next, block 680 sends an acknowledgement for all the in-sequence packets that were just processed by block 675. Processing of the received TCP packet is now complete.

Figure 5:
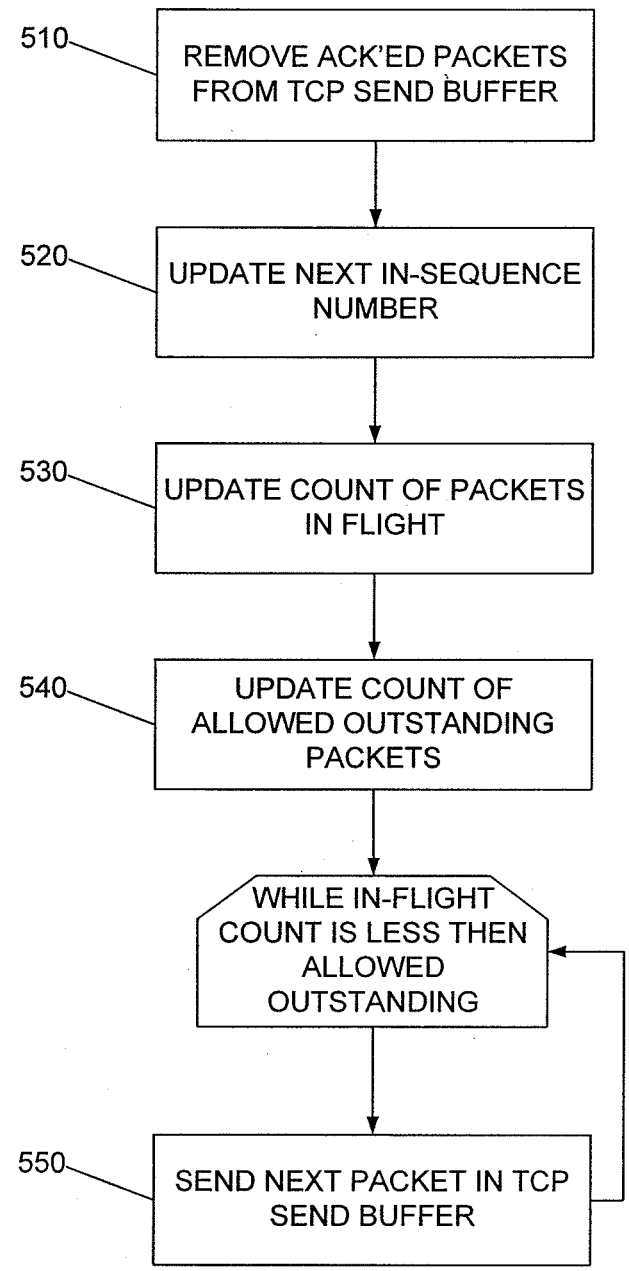
FIG. 5 is a flowchart showing processing of a received acknowledgement by the connection terminator 350 of FIG. 3.
Figure 6:
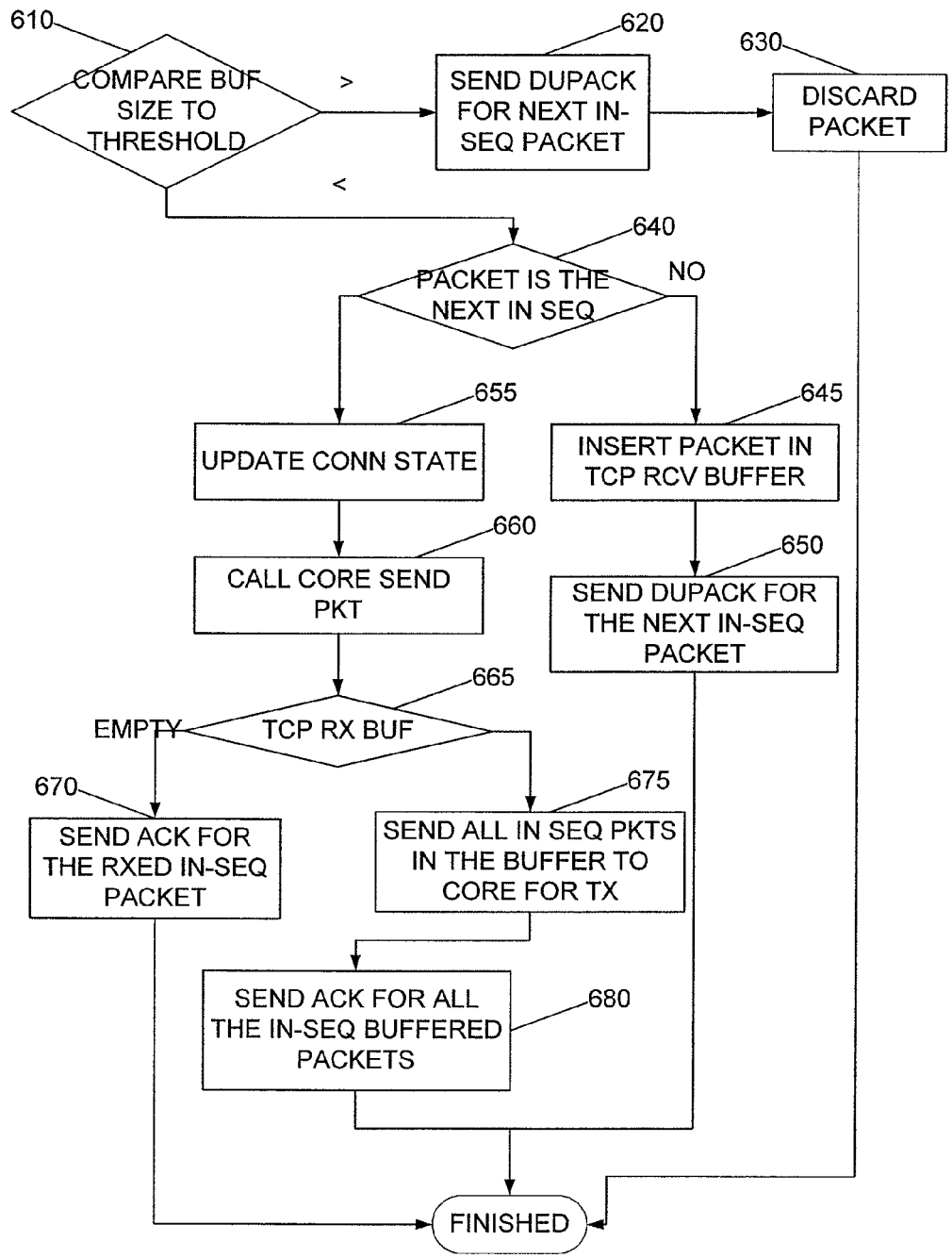
FIG. 6. is a flowchart showing processing of a TCP packet by the connection terminator 350 of FIG. 3.

The processing of TCP packets by logic 160 has been described in conjunction with the main data flow diagram of FIG. 4, along with the flow charts of FIGS. 5 and 6. Returning now to the main data flow diagram of FIG. 4, if the packet is classified (410) as an extended transport packet rather than a TCP packet, then the packet is provided to the core 370. The core 370 determines (460) whether the packet is an extended transport data packet (470) or an extended transport control or acknowledgement packet (480).

Figure 7A:
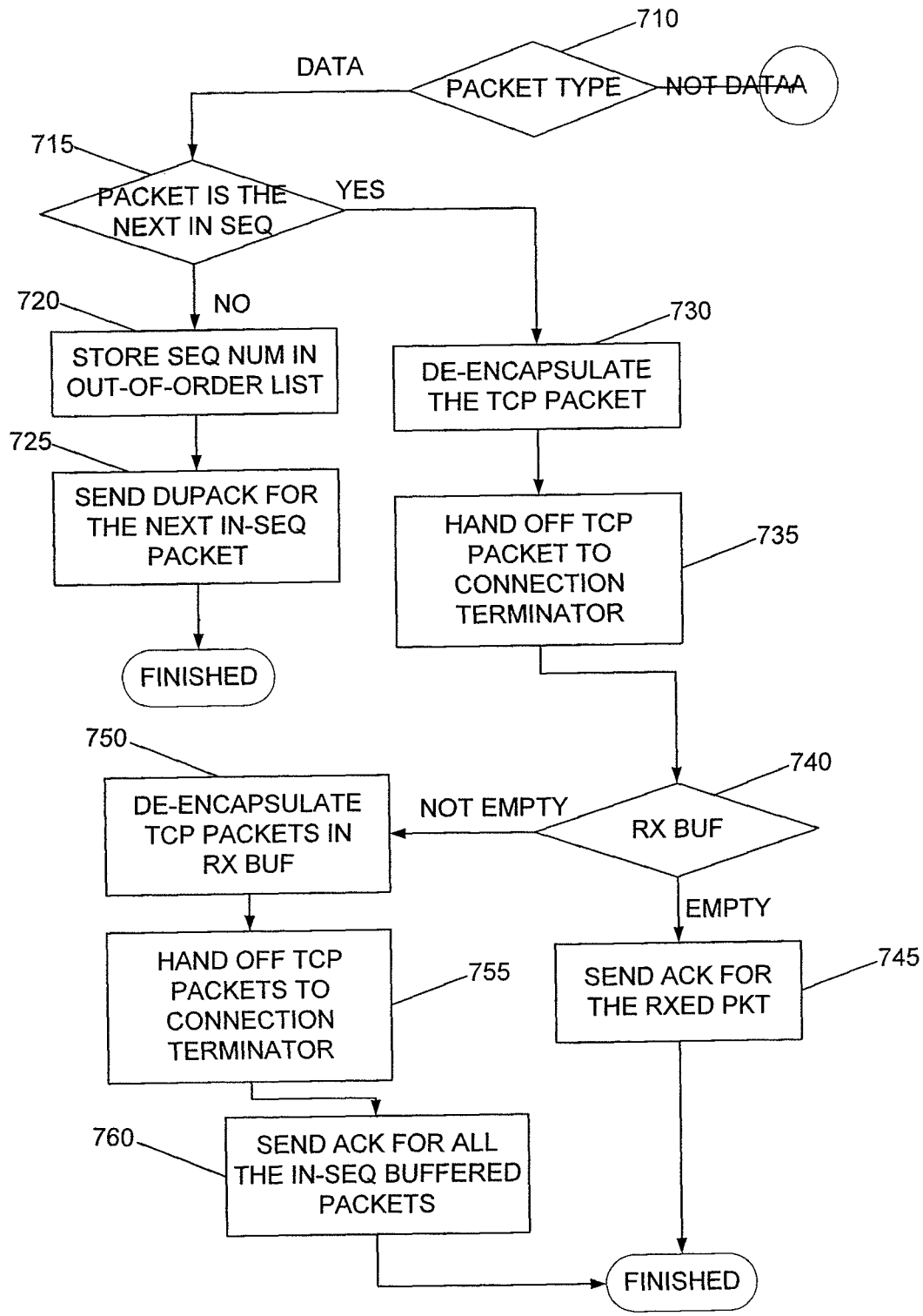
FIG. 7 is a flowchart showing processing of the extended transport data, control, or acknowledgement packet by the core 370 of FIG. 3.

Further processing of the extended transport data, control, or acknowledgement packet by the core 370 will now be described in connection with the flowchart of FIG. 7.

Processing of the received extended transport packet by the core 370 begins at block 710, which determines whether the received packet is extended transport data. If. No, then processing continues at block 765 (FIG. 7B), which will be discussed below. If the received packet is extended transport data, then processing continue at block 715, which determines whether the received data packet is the next in-sequence packet. If No, then processing continues at block 720, where the packet is stored in the receive buffer. Next, block 725 sends a DUPACK for the next in-sequence packet. Processing of the extended transport data packet is then complete.

Returning to block 715, if it is determined that the received data packet is not the next in-sequence packet, then block 730 de-encapsulates the TCP packet from the extended transport data packet, and the TCP packet is handed off at block 735 the connection terminator component 350 for further processing. After connection terminator processing, the core component's receive buffer is checked at block 740. If the receive buffer is empty, then processing continues at block 745, where an acknowledgment for the received extended transport data packet is sent, and processing of the received extended transport data packet is complete. However, if the core component's receive buffer is not empty, then block 750 handles the receive buffer by de-encapsulating the TCP packets contained within the in-sequence extended transport data packets in the receive buffer. Next, at block 755, the TCP packets are handed off to the connection terminator component 350 for further processing. After connection terminator processing, block 760 sends acknowledgements for all the processed in-sequence packets in the core receive buffer, and processing is complete.

Figure 7B:
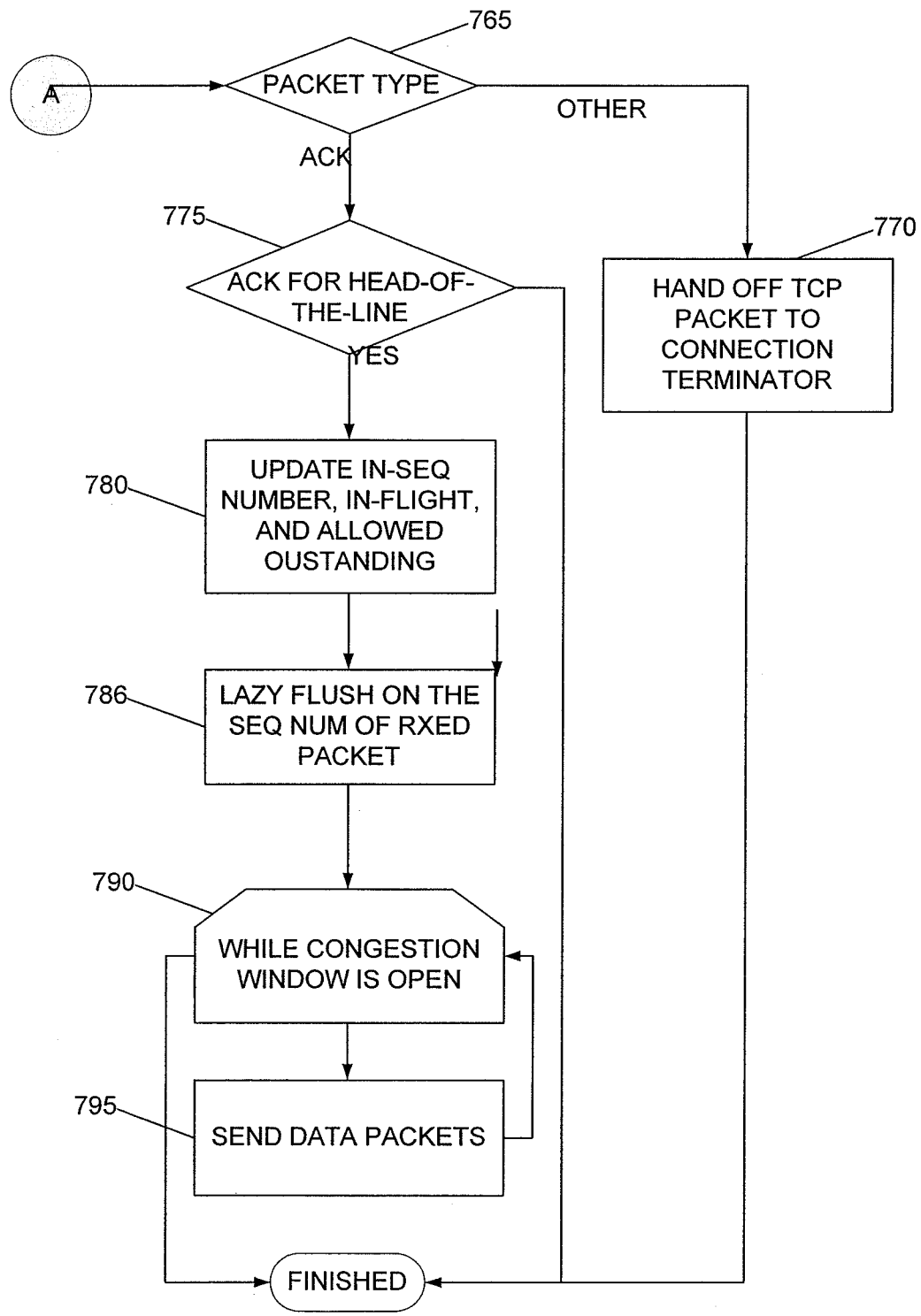

Returning to block 710, if the received packet is not an extended transport data packet, the packet is further classified at block 765 (FIG. 7B). If the packet is not an acknowledgment (e.g., an extended transport SYN, SYNACK, RESET or Heartbeat), then the packet is passed on at block 770 to the connection manager component 310 for further processing. On the other hand, if the packet is an extended transport acknowledgment, processing continues at block 775.

At block 775, the core 370 determines whether the acknowledgment is for the head-of-the-line packet. If No, then the packet is ignored and processing is complete. If Yes, then block 780 updates the next in-sequence number, number of in-flight packets, and number of outstanding packets allowed. After the statistics are updated, packets acknowledged by the received acknowledgement are removed from the receive buffer at block 785. In some embodiments, a "lazy free" technique is used to recapture the buffers. (The lazy free technique will be discussed below.) After buffer cleanup, the virtual connection manager 380 is queried, at block 790, to determine if the congestion window now allows new transmissions. If so, block 795 transmits new extended transport data packets until no more window space is available.

The lazy packet free mechanism, implemented by some embodiments of the core 370, delays freeing of acknowledged packets to a later point in the packet processing cycle. Specifically, when an acknowledgement arrives from the receiver notifying the receipt of multiple packets, the sender marks the list of acknowledged packets and defers the actual freeing of those packets for later. Then a specified number of packets are freed from the lazy buffer for every new packet that is transmitted by the sender. This amortizes the overhead of multiple packet memory free operations over multiple packet transmissions, and does not slow down the processing immediately after the receipt of acknowledgements.

Figure 8:
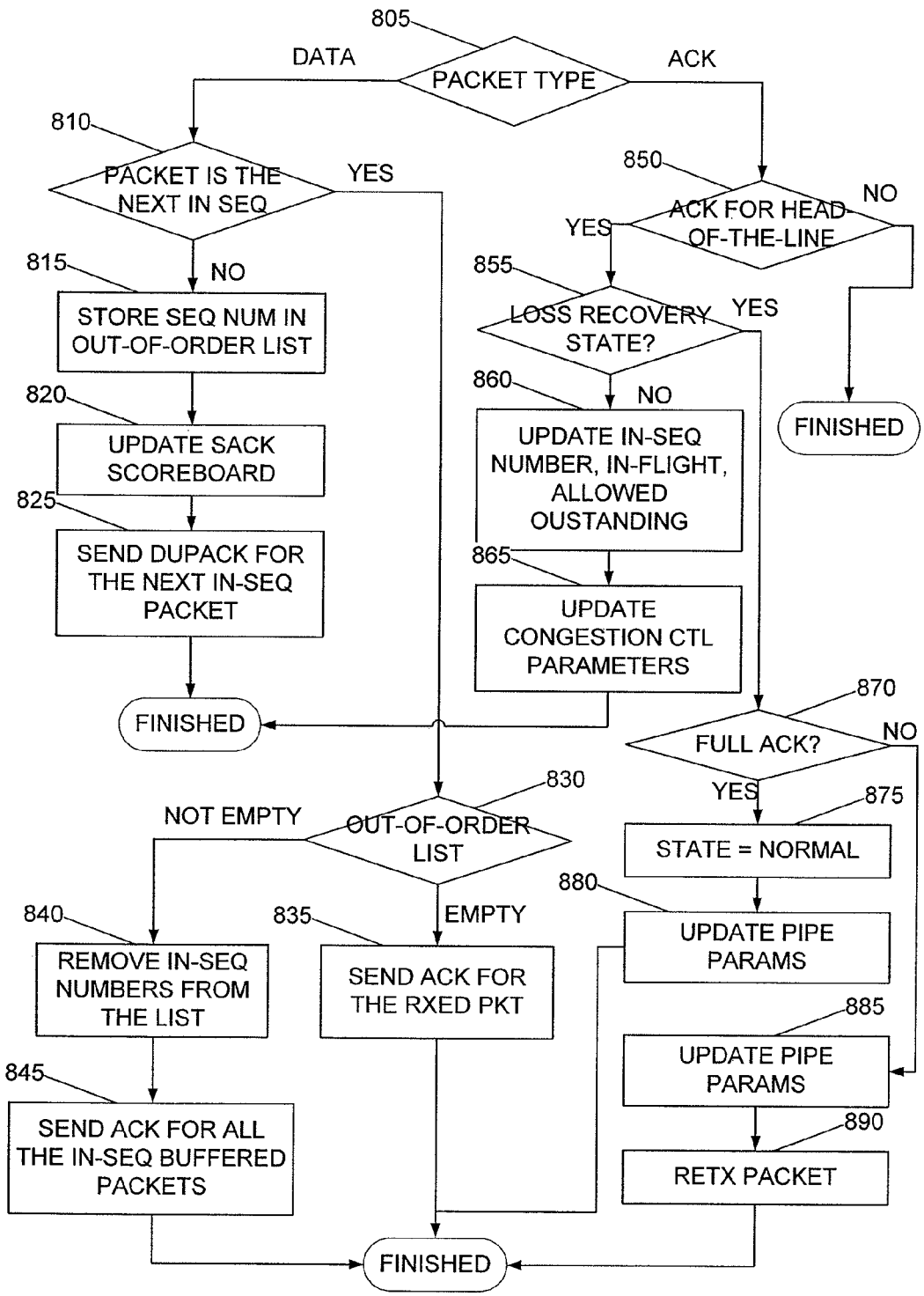
FIG. 8 is a flowchart showing processing of a received packet by the virtual connection manager 380 of FIG. 3.

FIG. 8 is a flowchart showing processing of a received extended transport packet by the virtual connection manager 380. These received packets, which include extended transport data packets and extended transport acknowledgement packets, are provided to the virtual connection manager 380 by the core 370. Processing of received extended transport packet by the virtual connection manager 380 begins at block 805, which determines whether the extended transport packet is data or acknowledgement. If Data, then processing continues at block 810, which determines whether the received data packet is the next in-sequence packet. If No, then processing continues at block 815, where the sequence number of the received data packet is stored in an out-of-order list. Next, block 820 updates the selective acknowledgement (SACK) scoreboard, and block 825 sends a DUPACK for the next in-sequence packet. Processing of the extended transport data packet is then complete.

Returning to block 810, if it is determined that the received data packet is the next in-sequence packet, then block 830 examines the out-of-order list. If the list is empty, the block 835 sends an acknowledgement for the received packet, and processing is complete. If the list is non-empty, then block 840 removes the in-sequence numbers corresponding to the received packet from the out-of-order list. Next, at block 845, an acknowledgement for all the in-sequence packets is sent, and processing of the received packet is finished.

Returning to the classification of the received packet at block 805, if the packet is an extended transport acknowledgment packet, then block 850 determines whether the acknowledgment is for the head-of-the-line packet. If No, then the packet is ignored and processing is complete. If Yes, then block 855 determines whether the core component is in the LOSS RECOVERY state. In one embodiment, the core component states include NORMAL, LOSS_RECOVERY, TIMEOUT, SYN_SENT, and SYN_RECVD. These states may vary according to the choice of transport protocol, as should be understood by a person of ordinary skill in the art.

If not in the loss recovery state, then the following statistics are updated at block 860: next in-sequence number; number of in-flight packets; and number of outstanding packets allowed. After the statistics are updated, the congestion control parameters are updated at block 865. In one embodiment, the congestion control parameters include the congestion window size and the threshold. Processing of the extended transport acknowledgement packet is then complete.

If block 855 determines that the core component is in the loss recovery state, then processing continues at block 870, which determines whether the acknowledgment is for all the outstanding packets at the time of entering the LOSS_RECOVERY state. If Yes, then the core component state is updated to NORMAL. At block 875, the pipe parameters are updated at block 880, and processing of the packet is complete. If block 870 determines that the acknowledgment is for less than all outstanding packets, then the parameters for the pipe (virtual end-to-end path) are updated at block 885. In one embodiment, these parameters include a next in-sequence number, a number of in-flight packets, and a number of outstanding packets allowed. The received packet is retransmitted at block 890, and processing is then complete.

Having described the overall operation of the logic 160 which implements the extended transport protocol 165, several features of this protocol will now be described. A person of ordinary skill in the art should understand that these features are generally independent of each other, so that a specific embodiment of the extended transport protocol 165 may include some combination of these features. The extended transport protocol 165 is not required to share memory with other applications and services unlike TCP. The entire memory of the device is can be dedicated for buffering packets of active connections. Further, this large buffer is shared flexibly among multiple active end-to-end connections without any fixed quotas for the connections. TCP's performance is limited in networks with large bandwidth-delay product due to the limit imposed on the maximum outstanding packets in the network. The extended transport protocol improves the performance of end-to-end connections in networks with large bandwidth delay product by eliminating the limitation of small windows and by achieving perfect sharing of the entire memory available to the system for buffering packets of active connections.

TCP's performance is limited in networks with large bandwidth-delay product due to the limit imposed on the maximum outstanding packets in the network. The extended transport protocol improves the performance of end-to-end connections in networks with large BDP by eliminating the limitation of small windows and by achieving perfect sharing of the entire memory available to the system for buffering packets of active connections.

Figure 9:
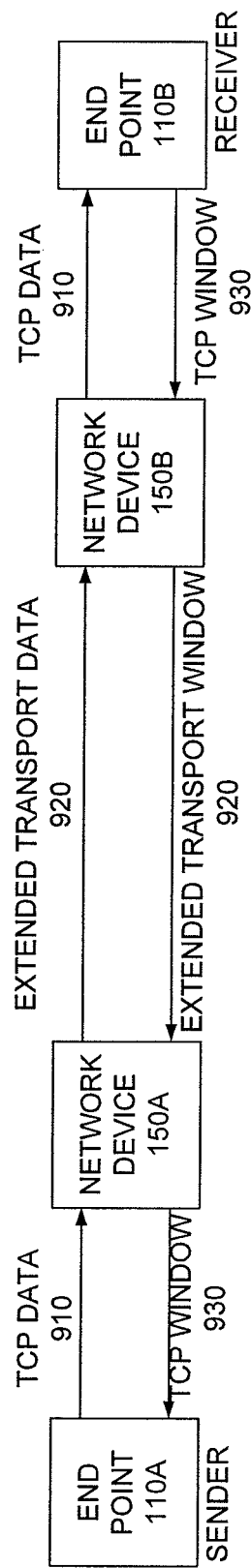
FIG. 9 is a flow diagram of a flow control mechanism used by some embodiments of logic 160 of FIG. 3.

FIG. 9 is a flow diagram of the flow control mechanism used by the extended transport protocol 165. In this example, endpoint 110A is the TCP sender, and endpoint 110B is the TCP receiver. The endpoint 110A sends TCP data messages 910 destined for the endpoint 110B. The network device 150A receives the TCP Data messages 910, encapsulates them into extended transport protocol data messages 920, and sends them on to the network device 150B. The network device 150B receives the TCP Data messages 920, removes the TCP data message 910 encapsulated within, and sends the TCP data message 910 on to the endpoint 110B.

Flow control is used on all three legs of the connection. The network device 150A, closest to the endpoint 110A, uses TCP flow control mechanisms to control the sending rate of the endpoint 110A. That is, the network device 150A manages its own endpoint-side receive buffers by sending TCP sliding window advertisement and/or freeze messages 930 back to the endpoint 110A. The endpoint 110A understands these TCP flow control messages 930 and throttles as indicated.

The endpoint 110B, receiving TCP data from endpoint 110A, also uses TCP flow control messages 930 to throttle the network device 150B closest to it. The network device 150B, which expects flow control messages from the endpoint side to be TCP flow control messages 930, throttles as indicated. When the network device 150B reduces the data rate as instructed by the endpoint 110B, network device 150B may in turn need to throttle the sending network device 150A. If so, the network device 150B sends extended transport flow control messages 940 to the network device 150A (different than the TCP flow control messages 930). This may in turn result in the router-side receive buffers within the network device 150B to fill up, at which point the network device 150B will throttle the endpoint 110A by sending TCP flow control messages 930. Thus, the data rate of the sending endpoint 110A can be affected by flow control on all three legs of the connection. A person of ordinary skill in the art should appreciate that when a network device 150 runs out of receive buffer space, this strategy provides a graceful back-pressure mechanism to slow down traffic on the network 130 between the network devices 150, and eventually back to the TCP sender endpoint 110A.

Some embodiments of the network device 150 include an additional level of flow control, is performed at the TCP connection level, which occurs when a single TCP connection exceeds a "fair share" of the receive buffer. Under this condition, the receiver network device 150 sends a TCP-freeze message for that specific TCP connection to the sender network device 150. In response, the sender network device 150 throttles the sending rate of the corresponding TCP connection on the remote side.

Figure 10:
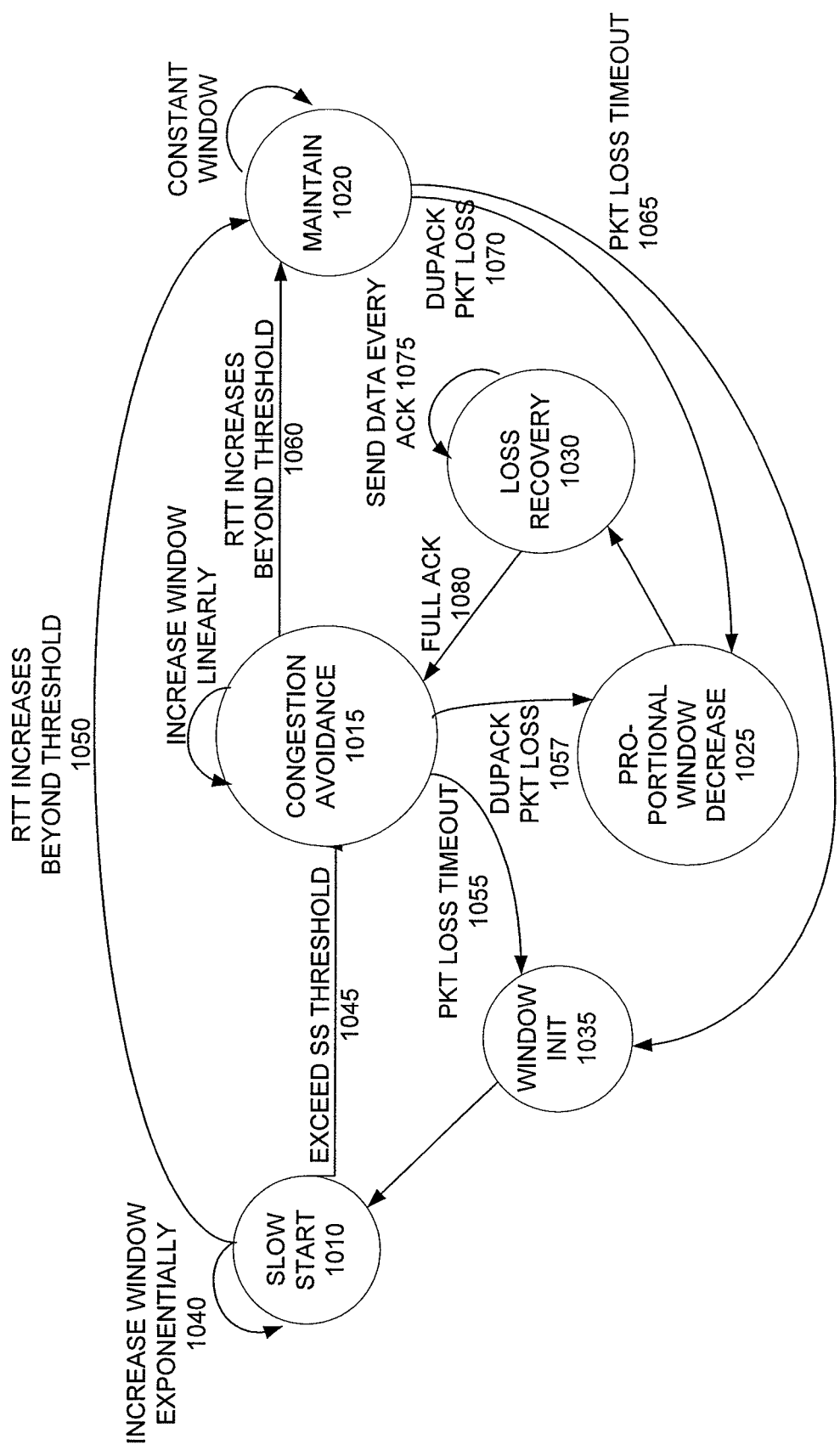
FIG. 10 is a state diagram of a congestion control mechanism used by some embodiments of logic 160 of FIG. 3.

FIG. 10 is a state diagram illustrating a congestion control mechanism implemented by some embodiments of the network device 150. The algorithm transitions between six states: SlowStart 1010; CongestionAvoidance 1015; Maintain 1020; ProportionalDecrease 1025; LossRecovery 1030; and InitializeWindow 1035. The extended transport protocol 165 begins in the SlowStart state 1010. While in the SlowStart state 1010, the congestion window on a connection is periodically increased in a non-linear manner (1040). In one embodiment, this If the congestion window reaches a threshold (1045) while in the SlowStart state 1010, the sender transitions to the Congestion Avoidance state 1015. If instead the roundtrip time of the connection through the network 130 (as measured by a probe) reaches a threshold (1050), the sender transitions to the Maintain state 1020, which will be discussed below.

The Congestion Avoidance state 1015, reached from the SlowStart state 1010, is exited when an event indicating packet loss (1055 or 1057). The Congestion Avoidance state 1015 may also be exited when the round-trip time of the connection through the network 130, as measured by a probe, increases beyond a threshold value (1060), In the case of timeout event that indicates packet loss (1055), the sender transitions to the InitializeWindow state 1035, where the congestion window is reset to an initial value, and the sender then returns to the SlowStart state 1010. In the case of duplicate acknowledgement event that indicates packet loss (1057), the sender transitions to the Proportional Decrease state 1025, discussed below. In the case of roundtrip time reaching a threshold (1060) from the Congestion Avoidance state 1015, the sender transitions to the Maintain state 1020.

While in the Maintain state 1020, the congestion window stays fixed at the last-computed value until packet loss occurs, as indicated by either a timeout (1065) or a duplicate acknowledgment (1070. In the case of a timeout 1065, and the sender returns to the SlowStart state 1010. In the case of a duplicate acknowledgement 1070, the sender transitions to the Proportional Decrease state 1025.

In the Proportional Decrease state 1025, the sender reacts to the detection of congestion loss by throttling the rate by a value proportional to the number of lost packets, and then enters the Loss Recovery state 1030. On entering the Loss Recovery state 1030, the congestion window is set to the number of outstanding packets at the time of the loss, reduced by an amount proportional to the number of packets lost in the network 130 during one round-trip time. This mechanism ensures that new packets are transmitted before lost packets during loss recovery. While in the Loss Recovery state 1030, data is sent for every acknowledgement (1075). Upon acknowledgement for all the outstanding packets at the time of entering the loss recovery (1080), the sender exits the Loss Recovery state 1030 and returns to the Congestion Avoidance state 1015. Upon a timeout indicating packet loss, the congestion window is reset to the original window size at the time of loss (in state 1035), and the sender returns to the SlowStart state 1010.

A person of ordinary skill in the art should appreciate that this loss recovery mechanism is a less aggressive method as compared to TCP. TCP is designed such that any packet losses that occur during the connection progress are interpreted as a sign of network congestion, and TCP reacts by throttling the rate of the connection by half. The proportional decrease mechanism used by the extended transport protocol 165 is more appropriate in environments (e.g., wireless data networks and private WANs) where provisioned bandwidth is available. Apart from achieving less aggressive congestion control, the proportional decrease mechanism employed by the extended transport protocol 165 is able to handle random packet losses better than the multiplicative decrease mechanism used by TCP. Since the extended transport protocol 165 reduces the congestion window in proportion to the number of packet losses, the impact of random losses on congestion control is decreased.

A person of ordinary skill in the art should also recognize that the above adjustment of the congestion window can result in a scenario where the updated congestion window allows for a large number of packet transmissions at the exit of the loss recovery state. In some embodiments of the extended transport protocol 165, the receiver network device 150 spreads these packet transmissions over future acknowledgments by limiting the number of new packet transmissions to two for every receipt of a new acknowledgment.

A person of ordinary skill in the art should appreciate the differences between the congestion algorithm of FIG. 10 and that used by conventional transport protocols, such as TCP. TCP uses a linear increase strategy for rate probing: if the available capacity is C units, and the current data rate of a TCP connection is C-X units, then TCP will take approximately X round-trip times to reach the ideal operating point for the connection data rate. Thus, TCP is slow in reacting to both the availability of new resources on the network 130, and to lower bitrate operations that resulted from previous reductions in the congestion window. When the round-trip time is large, TCP takes a long time to reach the ideal operating point. Short-lived connections such as SSL transactions can finish data transfer completely before reaching the ideal operating point. Further due to the multiplexing of multiple end-to-end connections into already established extended transport protocol connections, the network device eliminates the start-up probing delay for these end-to-end connections. This is possible because of sharing of network information among end-to-end connections through the extended transport protocol connection through which they are multiplexed. This start-up delay reduction significantly improves the performance of transactional applications which have short lifetimes.

Furthermore, TCP has a tendency to induce losses even during routine congestion control operations, because the TCP congestion control process has only two phases; an increase phase and a decrease phase. Even without external congestion in the network 130, TCP continues to increase the connection data rate until congestion is induced in the network 130 and a loss occurs, whereupon the decrease phase kicks in and the rate is halved for a repetition of the congestion control cycle. This unnecessary cycle that involves forced decreases and slow increases further limits the performance of TCP connections.

The extended transport protocol 165 also features a loss detection mechanism which is more suitable for high-speed networks than conventional transport protocols. Instead of using high overhead timeouts to detect loss, the extended transport protocol 165 uses passive learning techniques based on the number of packets sent, number of packets received, and sequence numbers of packets sent at appropriate milestone events during loss detection. More specifically, the sender network device 150 uses a monotonically increasing sequence number called CONG_SEQ_NUM on all the packets it transmits. The receiver network device 150 reflects the CONG_SEQ_NUM on the received packets on the acknowledgements as the ACK_CONG_SEQ. When the ACK_CONG_SEQ is greater then the CONG_SEQ_NUM on a corresponding retransmitted packet, the sender network device 150 concludes that the retransmitted packet is lost and takes appropriate action to recover from that loss. Without this mechanism, the only way to determine whether a retransmitted packet is lost is using a timeout mechanism which is an inefficient use of precious network bandwidth.

The loss reporting mechanism used by the extended transport protocol 165 allows faster reporting than conventional techniques by accommodating a greater number of lost blocks, and incorporating a multi-level selective acknowledgment (SACK) mechanism. Unlike the single-tiered SACK mechanism used by conventional TCP, the extended transport protocol 165 uses multiple levels of SACK to convey losses to the sender network device 150. Each SACK block has both the start and end of the lost block of packets as well as the transmission cycle number of the loss recovery phase. The transmission cycle number is identified by the number of retransmissions of the packets in the SACK block. The sender network device 150 gives priority to the minimum transmission cycle number with respect to the retransmission process.

The network device 150 also uses coarse timeouts to handle cases where the network 130 is down for a long duration when no packets reach the receiver. Every time a new data packet is acknowledged by the receiver (indicated by an acknowledgment), the timer is reset. When the timer expires, it indicates that the head-of-line packet in the send buffer was not successfully delivered and hence should be retransmitted. These coarse timeouts are able to handle temporary network outages, while the CONG_SEQ_NUM-based loss detection and recovery mechanism described above works only when there are packets reaching the receiver and thus triggering acknowledgements to the sender.

Yet another feature of the extended transport protocol 165 increases reliability by using sequence numbers differently than conventional transport protocols. The receiver network device 150 uses a NXT_SEQ_NUM field in the acknowledgement to communicate to the sender network device 150 the status of the receive buffer at the receiver network device 150. The NXT_SEQ_NUM is the sequence number of the head-of-line packet in the receiver's out-of-order buffer. The sender uses the NXT_SEQ_NUM value to determine whether the received acknowledgement is a "true partial acknowledgment" or a "false partial acknowledgment". A true partial acknowledgment acknowledges the receipt of all packets less than the NXTSEQ_NUM, though not all the packets outstanding at the time of loss. A false partial acknowledgement does not acknowledge the receipt of all packets less than the NXT_SEQ_NUM, though it acknowledges the next in-sequence packet expected by the receiver. By using the NXT_SEQ_NUM field to differentiate between true and false partial acknowledgments, the sender network device 150 increases the utilization of the network 130 even during loss recovery.

Yet another difference between the extended transport protocol 165 and conventional transport protocols, such as TCP, is that some embodiments of the extended transport protocol 165 have no limit on the advertised (sliding) window size or the congestion window size. Other embodiments of the extended transport protocol 165 do have a limit. Some of these embodiments have limits that are much larger than the limits used by conventional protocols.

FIG. 11 is a hardware block diagram of a network device 150 in accordance with the system and method for improving performance of transport protocols. The network device 150 contains a number of components that are well known in the art of data communications, including a processor 1110, a local network interface 1120, a remote local interface 1130, memory 1140, and non-volatile storage 1150. Examples of non-volatile storage include, for example, a hard disk, flash RAM, flash ROM, EEPROM, etc. These components are coupled via bus 1160. Memory 1140 contains logic for improving performance of transport protocols 160 from FIG. 1.

The network device 150 is shown with two network interfaces. The local network interface 1120 is in communication with endpoint 110, and the remote local interface 1130 is in communication with router 140. A person of ordinary skill in the art should understand that the networks interfaces may be of different types, support different medias and speeds, etc. Omitted from FIG. 11 are a number of conventional components, known to those skilled in the art, that are not necessary to explain the operation of the network device 150.

Any process descriptions or blocks in flowcharts should be understood as representing modules, segments, or portions of code which include one or more executable instructions for implementing specific logical functions or steps in the process. As would be understood by those of ordinary skill in the art of the software development, alternate implementations are also included within the scope of the disclosure. In these alternate implementations, functions may be executed out of order from that shown or discussed, including substantially concurrently or in reverse order, depending on the functionality involved.

The systems and methods disclosed herein can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example but not limited to, a system or propagation medium that is based on electronic, magnetic, optical, electromagnetic, infrared, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to) an optical fiber and a portable compact disk read-only memory (CD-ROM).

The foregoing description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable one of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

We claim:

1. A method of controlling congestion in a network between a first network device and a peer second network device, the method comprising the steps of:
    establishing, by the first network device, a connection between the first network device and the peer second device, wherein the connection has an associated congestion window;
    setting, by the first network device, the congestion window size to an initial value;
    in a first state of the first network device, exponentially increasing the congestion window size;
    in response to the congestion window size exceeding a first threshold value while in the first state, transitioning the first network device to a second state;
    in the second state, linearly increasing the congestion window size;
    in response to a round trip time of a connection between the first network device and the peer second network device exceeding a second threshold value while in the second state, transitioning the first network device to a third state;
    in the third state, maintaining the congestion window size until a packet loss occurs;
    transmitting from the first network device to the peer second device a series of packets as well as a transmission cycle number associated with the series of packets;
    receiving at the first network device from the peer second device a selective acknowledgment containing an acknowledged transmission cycle number; and
    retransmitting the series of packets from the first network device to the peer second device, if the acknowledged transmission cycle number is equal to or greater than the transmission cycle number associated with the series of packets.

2. The method of claim 1, further comprising the steps of:
    if the packet loss occurs, transitioning the first network device to a fourth state; and
    in the fourth state, decreasing the congestion window size in proportion to the number of packets lost.

3. The method of claim 1, further comprising the steps of:
    detecting a loss of packets;
    upon detecting the loss of packets, recording a number of unacknowledged packets at the time of loss detection;
    receiving an acknowledgment containing a sequence number of the next packet in an out-of-order buffer of a peer receiver;
    determining, based on the sequence number of the next packet, whether the received acknowledgement is a true partial acknowledgement or a false partial acknowledgement;
    if the received acknowledgement is a true partial acknowledgement, retransmitting a requested packet; and
    if the received acknowledgement is a false partial acknowledgement, not retransmitting a requested packet.

4. The method of claim 1, further comprising the steps of:
    if the packet loss occurs as a result of a timeout, transitioning the first network device to the first state.

5. A network device for controlling congestion in a network, comprising:
    a processor; and
    a memory, coupled to the processor, wherein the memory has logic embodied thereon for:
        establishing, by the network device, an connection between the first device and the peer second device, wherein the connection has an associated congestion window,
        setting, by the network device, the congestion window size to an initial value;
        in a first state of the network device, exponentially increasing the congestion window size,
        in response to the congestion window size exceeding a first threshold value while in the first state, transitioning the network device to a second state,
        in the second state, linearly increasing the congestion window size,
        in response to a round trip time of a connection between the first device and the peer second device exceeding a second threshold value while in the second state, transitioning the network device to a third state,
        in the third state, maintaining the congestion window size until a packet loss occurs;
        transmitting from the first network device to the peer second device a series of packets, as well as a transmission cycle number associated with the series of packets;
        receiving at the first network device from the peer second device a selective acknowledgment containing an acknowledged transmission cycle number; and
        retransmitting the series of packets from the first network device to the peer second device, if the acknowledged transmission cycle number is equal to or greater than the transmission cycle number associated with the series of packets.

6. The network device of claim 5, further comprising logic for:
    if the packet loss occurs, transitioning the first network device to a fourth state; and
    in the fourth state, decreasing the congestion window size in proportion to the number of packets lost.

7. The network device of claim 5, further comprising logic for:
    transmitting a first series of packets, each including an increasing sequence number;
    receiving a second series of packets, each including an acknowledged sequence number; and
    if one of the acknowledged sequence numbers is greater than the increasing sequence number of a corresponding one of the first series of packets, indicating loss of a packet.

8. The network device of claim 5, further comprising logic for transmitting a selective acknowledgment containing a start sequence number, an end sequence number and a transmission cycle number.

9. The network device of claim 8, further comprising logic for:
    determining whether the selective acknowledgment refers to an original packet or a subsequent retransmission of the original packet based on the transmission cycle number.

10. The network device of claim 5, further comprising logic for:
    detecting a loss of packets;
    upon detecting the loss of packets, recording a number of unacknowledged packets at the time of loss detection; and receiving an acknowledgment containing a sequence number of the next packet in an out-of-order buffer of a peer receiver.

11. The network device of claim 10, further comprising logic for:
   determining, based on the sequence number of the next packet, whether the received acknowledgement is a true partial acknowledgement or a false partial acknowledgement;
   if the received acknowledgement is a true partial acknowledgement, retransmitting a requested packet; and
   if the received acknowledgement is a false partial acknowledgement, not retransmitting a requested packet.

12. A system for controlling congestion, comprising:
   a first endpoint device;
   a second endpoint device;
   one or more routers configured for transporting traffic across a network between the first endpoint device and the second endpoint device;
   a first network device and a peer network second device, logically located
      between the first endpoint device and the second endpoint device, wherein
         the first endpoint device is configured to communicate with the first network device using a first transport protocol,
         the second endpoint device is configured to communicate with the second network device using a first transport protocol,
         the first network device is configured to communicate with the peer second network device using a second transport protocol, wherein the second transport protocol comprises,
            establishing, by the first network device, an aggregated establishing, by the first network device, an connection between the first network device and the peer second device, wherein the connection has an associated congestion window,
            setting, by the first network device, the congestion window size to an initial value,
            in a first state of the first network device, exponentially increasing the congestion window size,
            in response to the congestion window size exceeding a first threshold value while in the first state, transitioning the first network device to a second state,
            in the second state, linearly increasing the congestion window size,
            in response to a round trip time of a connection between the first network device and the peer second network device exceeding a second threshold value while in the second state, transitioning the first network device to a third state,
            in the third state, maintaining the congestion window size until a packet loss occurs;
            transmitting from the first network device to the peer second device a series of packets, as well as a transmission cycle number associated with the series of packets;
            receiving at the first network device from the peer second device a selective acknowledgment containing an acknowledged transmission cycle number; and
            retransmitting the series of packets from the first network device to the peer second device, if the acknowledged transmission cycle number is equal to or greater than the transmission cycle number associated with the series of packets.

13. The system of claim 12, wherein the second transport protocol further comprises:
   if the packet loss occurs, transitioning the first network device to a fourth state; and
   in the fourth state, decreasing the congestion window size in proportion to the number of packets lost.

* * * * *